(12) United States Patent
Riddiford

(10) Patent No.: US 8,159,818 B2
(45) Date of Patent: Apr. 17, 2012

(54) DOCKING APPARATUS FOR PORTABLE DEVICE

(75) Inventor: Martin Riddiford, London (GB)

(73) Assignee: Tomtom International B.V., Amsterdam (NL)

( * ) Notice: Subject to any disclaimer, the term of this patent is extended or adjusted under 35 U.S.C. 154(b) by 202 days.

(21) Appl. No.: 11/907,255

(22) Filed: Oct. 10, 2007

(65) Prior Publication Data

US 2009/0097192 A1    Apr. 16, 2009

(51) Int. Cl.
H05K 7/00 (2006.01)
H05K 5/00 (2006.01)
G06F 1/16 (2006.01)
G06F 13/00 (2006.01)

(52) U.S. Cl. ........... 361/679.41; 361/679.4; 361/679.42; 361/679.43; 361/679.44; 361/679.45; 361/679.55; 361/679.56; 361/679.57; 361/679.58; 361/679.59; 710/303; 710/304; 312/223.1; 312/223.2; 312/223.3

(58) Field of Classification Search .. 361/679.4–679.44; 710/303, 304
See application file for complete search history.

(56) References Cited

U.S. PATENT DOCUMENTS

| 6,692,053 | B1 | 2/2004 | Smith | |
| 7,201,407 | B2 * | 4/2007 | Schlack | 292/139 |
| D545,310 | S * | 6/2007 | Chen | D14/480.5 |
| 2006/0187629 | A1 * | 8/2006 | Emery et al. | 361/684 |
| 2007/0171316 | A1 | 7/2007 | Mathias et al. | |

FOREIGN PATENT DOCUMENTS

| DE | 4107995 A1 | 9/1992 |
| DE | 19817345 A1 | 10/1999 |
| DE | 19951968 A1 | 5/2001 |
| DE | 10202061 A1 | 9/2002 |
| DE | 102006008420 A1 | 8/2007 |
| EP | 0822693 A | 2/1998 |
| EP | 0950572 A | 10/1999 |
| WO | 01/61875 A | 8/2001 |
| WO | 2007/109703 A | 9/2007 |

OTHER PUBLICATIONS

International Search Report issued Oct. 27, 2008 for International Application No. PCT/EP2007/008734.

* cited by examiner

*Primary Examiner* — Jayprakash N Gandhi
*Assistant Examiner* — Jerry Wu

(57) ABSTRACT

A docking apparatus for a portable device, comprising a base and a mounting part which is connected to the base, wherein the mounting part is pivotally mounted within said base and consists of a cover portion which in a first position lies in substantially co-planar relationship with a lip of said base, said cover portion capable of being pivoted to a second position wherein part of the cover portion extends substantially from the docking apparatus, said pivotal motion also revealing a fin part depending from the underside of said cover portion so that in said second position, said fin part lies in substantially co-planar relationship with said lip instead of said cover portion.

15 Claims, 9 Drawing Sheets

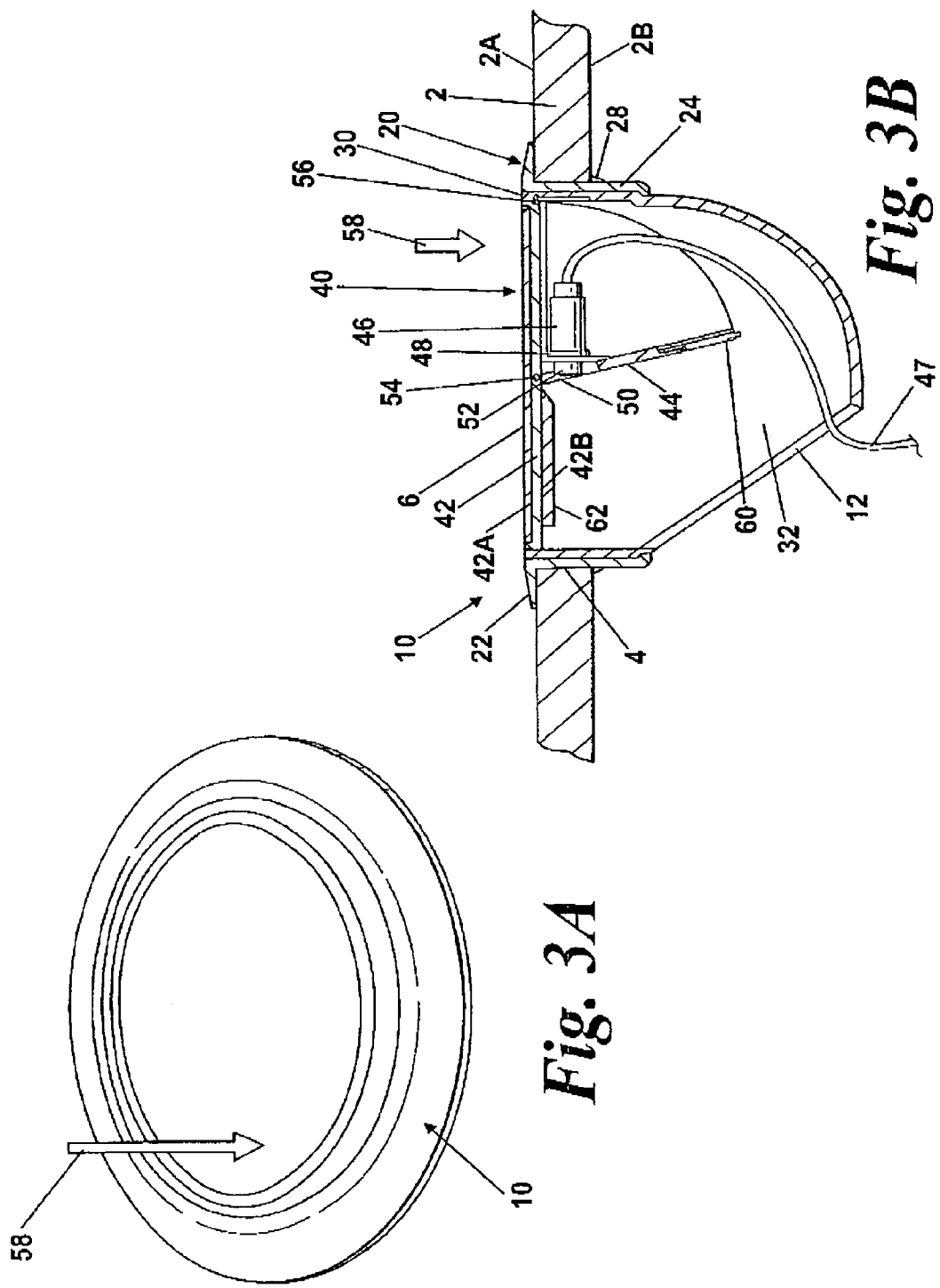

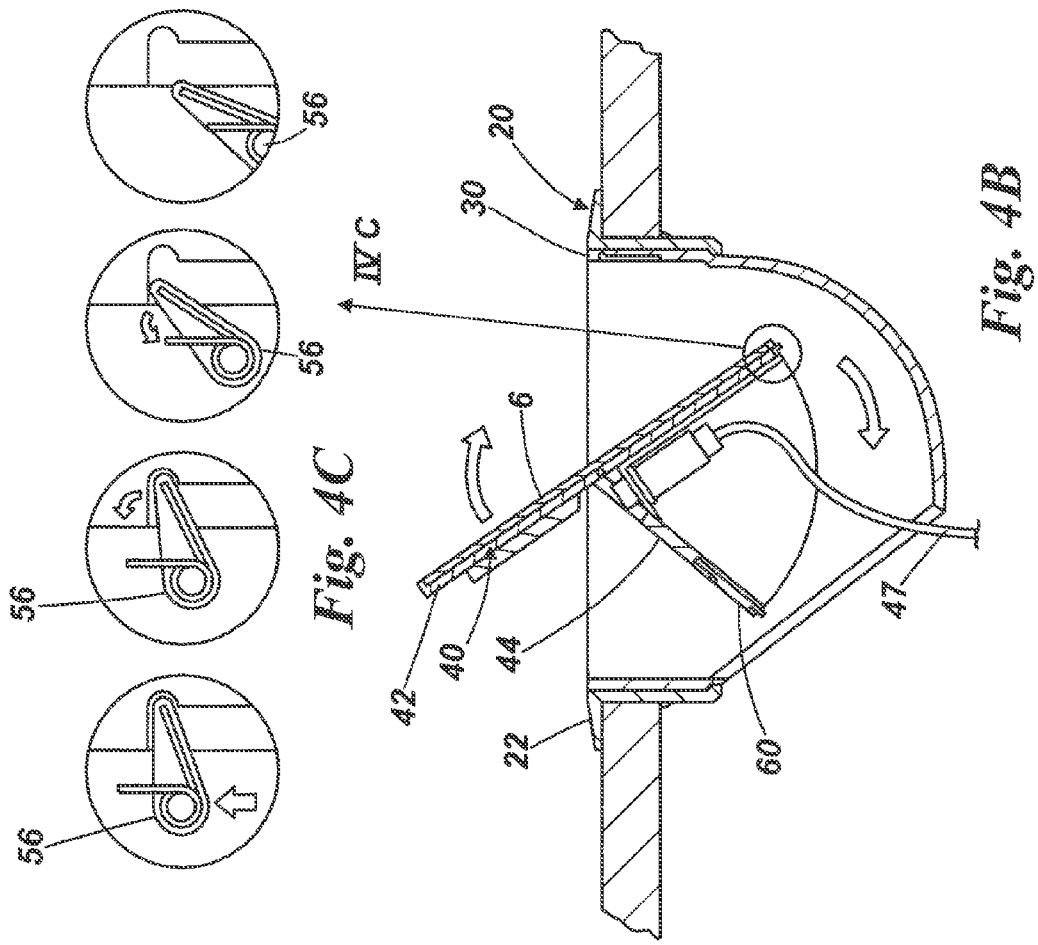
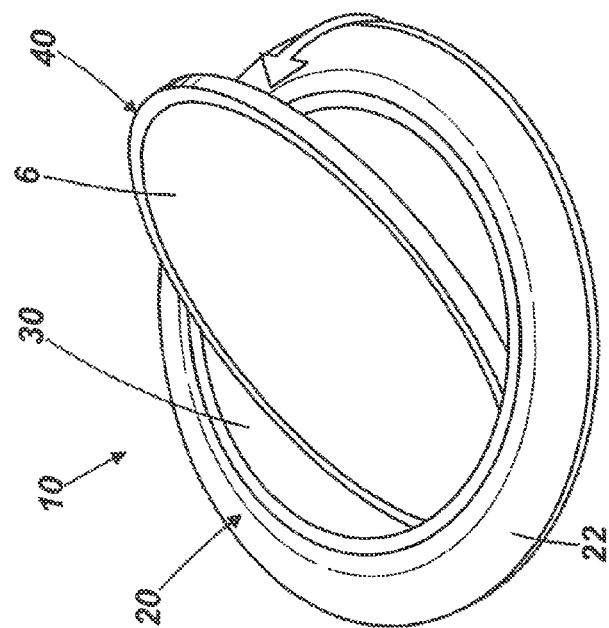

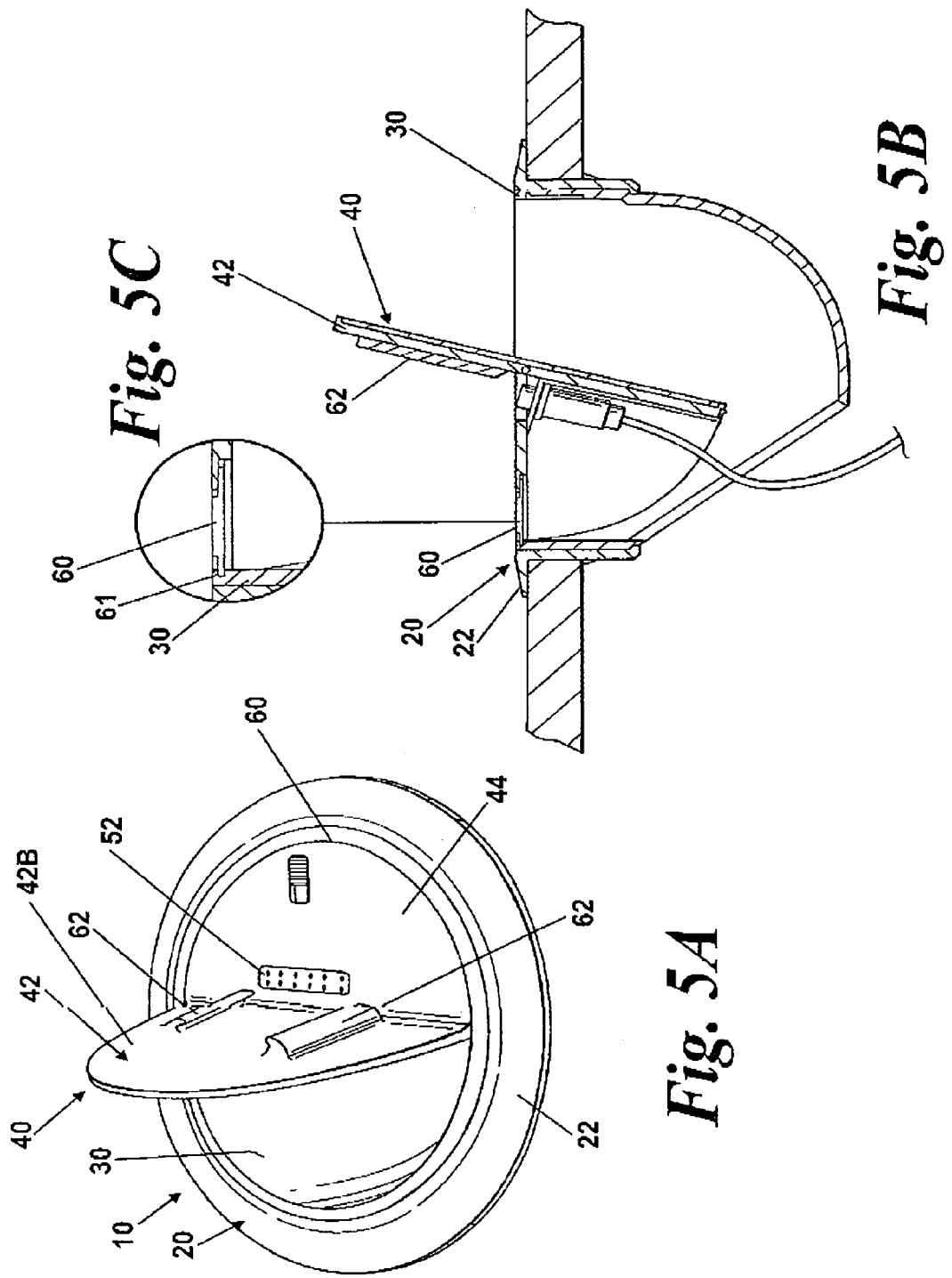

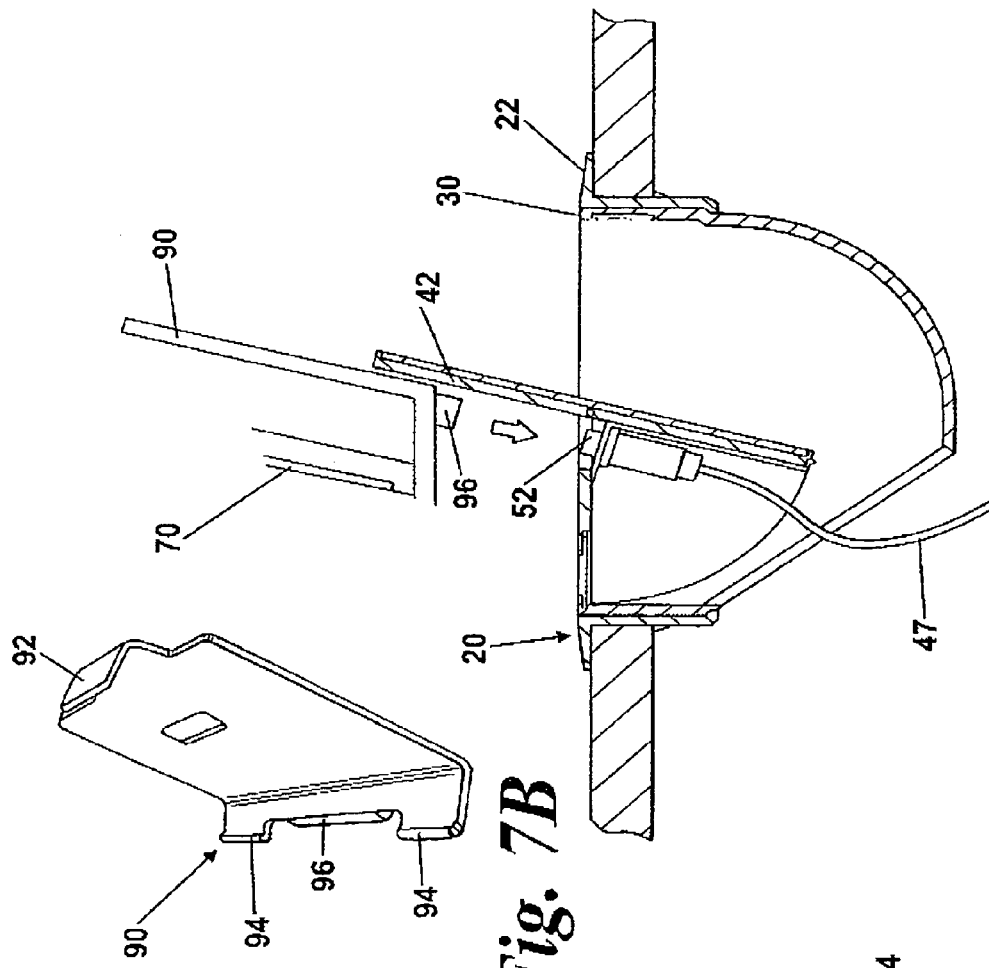
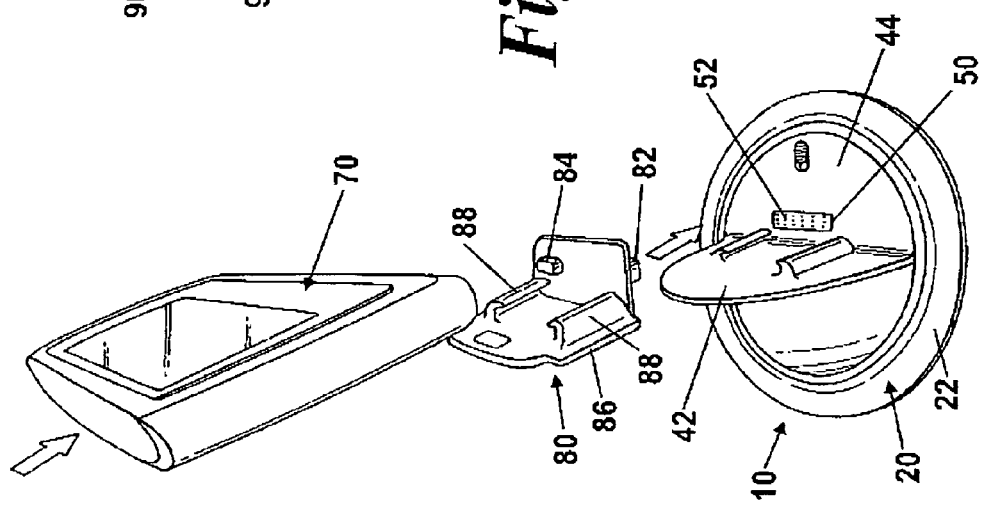

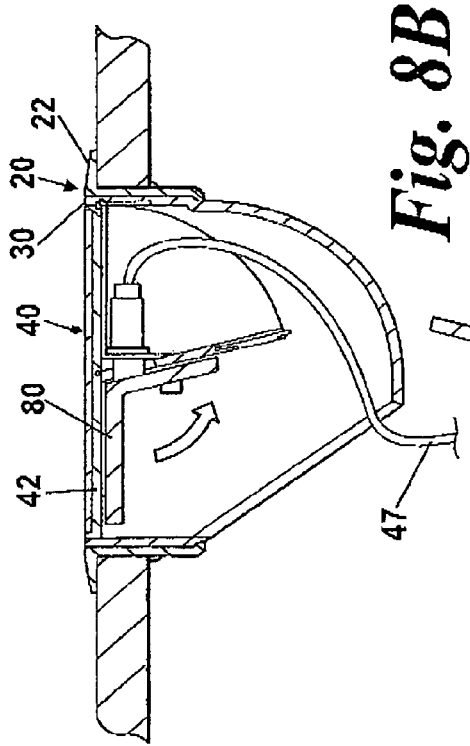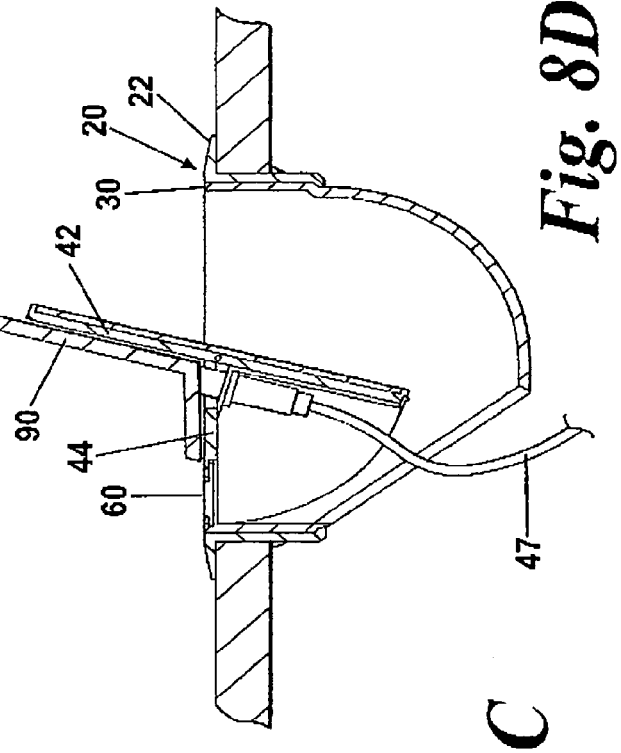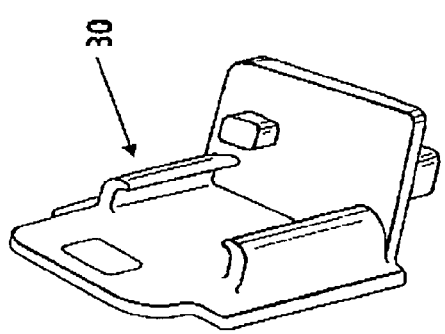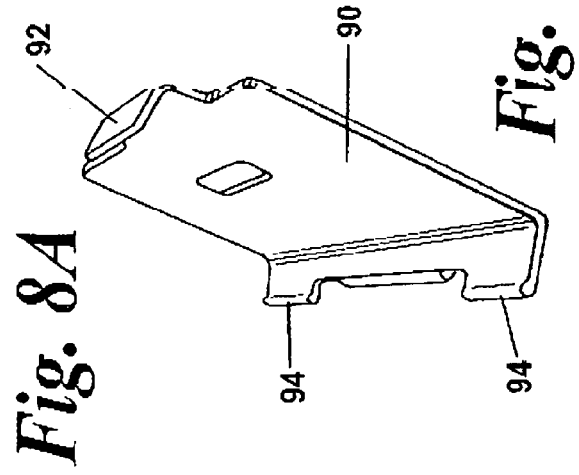

DOCKING APPARATUS FOR PORTABLE DEVICE

FIELD

This invention is concerned with a docking apparatus for a portable device, preferably a portable electric or electronic device requiring a source of power or other electric or electronic signals, and in particular, but not exclusively, a portable navigation device (PND).

BACKGROUND

Docking apparatuses for electronic devices are well known. The reader will be aware that docking stations for laptop computers are available and have features which cooperate in some way with corresponding and suitably designed features of the laptop itself. Specifically, the docking station will inevitably be provided with a power and/or data transfer component, typically in the form of a connector, which is received in a corresponding socket within the laptop primarily to provide a source of power thereto, and optionally to pass other electric and electronic signals, such as video signals, data, USB signals and the like to and from the laptop. Aside from this basic requirement, there are few other requirements for the docking station, except that is should support the weight of the laptop.

In the case of portable navigation devices, which are most commonly used as in-car devices, the provision of a docking station is a more complex proposition, particularly as the majority of vehicle manufacturers are highly sensitive about alterations to the appearance of the cabin, particularly any such alterations which might be obtrusive or worse, unsafe either under normal driving conditions or in an accident.

Semi-integrated docking apparatuses for the in-car market have therefore been proposed. However, such propositions have in the past foundered on account of additional development costs required on the part of the vehicle manufacturer, and potential incompatibility issues between the electric and electronic signals commonly routed within vehicles and those required for or provided by in-car PNDs, and the connectors commonly provided on such devices and those which might be proposed by the vehicle manufacturers. Not withstanding these difficulties, the rapid and almost global adoption of PNDs has forced vehicle manufacturers to act.

Initial attempts by the automotive industry to adapt to the PND market have proved relatively unsuccessful, due mainly to the need for a reliable physical connection and the hugely differing development and life cycles between vehicle manufacturers and the consumer electronics industry. Additionally, there is a threat that national governments will introduce legislation that prevents the currently used PND "cradles". The current cradles are typically provided with a suction disc for attachment to the inner surface of the windscreen of the car, and a mounting part with features which cooperate with corresponding features provided on the PND unit such that the pair can be releasably connected together. Inevitably, the attachment of the these often bulky cradles to the windscreen, and the fact that such devices necessarily mount the PNDs in the cabin space of the vehicle away from the windscreen is distracting and in certain positions, can reduce driver and/or passenger visibility.

A further consideration is one of security. PND adoption has become so widespread that thieves are now targeting vehicles in which a suction disc mark can be seen on the inner surface of the windscreen, regardless of whether the cradle remains attached to the windscreen inside the vehicle.

A further disadvantage with the current situation is that PNDs are currently commonly provided with cigarette lighter adapters (CLA) to provide a source of power. The cable emanating from the CLA is unsightly, but a necessity for medium to long journeys and frequent PND usage. A majority of potential navigation device customers see this as a drawback of PNDs and a reason for considering a semi- or fully-integrated navigation system.

At the time of this application, vehicle manufacturers have worked with PND suppliers to develop dashboard-embedded cradles that enable varying levels of integration.

A primary object of this invention therefore is to provide a docking apparatus which:
  reduces the product development time of vehicle manufacturers;
  is safe, functional, and offers reliable and sound physical and electrical connection with the PND attached thereto;
  is simple and quick to operate, in terms of PND connection and disconnection, and
  is concealable after PND disconnection, in which position it provides no indication to a potential thief that a PND device is owned by the vehicle owner.

BRIEF SUMMARY OF THE INVENTION

According to the invention there is provided a docking apparatus for a portable electric or electronic device requiring a source of power, said docking apparatus comprising at least a base and a mounting part which is connected to the base, said base being additionally provided with a partial or continuous peripheral lip to the inside of which depends a skirt capable of being inserted through an aperture in a mounting surface thereby securing the base to said surface, said lip preventing the base from falling through said aperture, Characterized in that The mounting part is pivotally mounted within the base and consists of at least a cover part which in a first position lies substantially flush with the lip to substantially conceal that portion of the base which lies beneath the mounting surface, said cover portion capable of being pivoted to a second position wherein part of the cover portion extends substantially upwardly from the docking apparatus, said pivotal motion also revealing a fin part attached to said underside of said cover part which in said second position lies substantially flush with said lip, and further characterized in that at least one of
  the part of the cover portion underside, and
  the fin part
which are exposed in the second position is provided with one or more features which cooperate with corresponding features provided on the electric or electronic apparatus to facilitate the connection of the latter to the former.

Preferably, the base and the mounting part are substantially circular in cross-section.

Further preferably, at least one of the mounting part and the base includes push-release means which in their locked condition secure the mounting part in the first position, and in their released condition allow pivotal movement of said mounting part.

Further preferably, at least one of the base and the fin part of the mounting part include cooperating locking means which facilitate the locking of the fin part to the base thus securing the mounting part in the second position.

In a modified aspect of the invention, the docking apparatus includes a base, a mounting part, and an intermediate part within which the mounting part is pivotally mounted, said intermediate part being secured to the base in a push-fit manner. In this modified aspect, it is preferred that the at least one of the mounting part and the intermediate part includes push-release means which in their locked condition secure the mounting part in the first position, and in their released condition allow pivotal movement of said mounting part. Additionally, further preferably, at least one of the base and the fin part of the mounting part include cooperating locking means which facilitate the locking of the fin part to the intermediate part thus securing the mounting part in the second position.

Preferably, the mounting part is capable of both pivoting and rotating, such rotational movement being achieved either by being rotationally mounted in either the base or the intermediate part if provided, or alternatively by means of the intermediate part being rotationally mounted in the base part.

Most preferably, the cooperating connection features are provided on the underside of the cover part of the mounting part, such allowing the portable device to be slidingly connected to said cover part when disposed in an upward condition when the mounting part is in the second position.

Most preferably, the fin part is provided with at least an aperture through which either a connecting cable may pass, or by means of which an electrical connection to the portable device may be achieved. In this latter embodiment, it is preferred that the fin part includes electrical connection means, such being preferably disposed proximately the lower reaches of the cooperating connection features on the underside of the cover part such that complete sliding connection of the portable device thereto simultaneously achieves electrical connection between the portable device and said electrical connection means.

In a particularly preferred embodiment, the mounting and electrical connection of a portable device is achieved through an intermediate adapter component which include connection features adapted to cooperate with the connection features provided on the underside of the cover part or the fin part of the mounting part as the case may be, and additionally include at least one of Different connection features which are capable of cooperating with corresponding connection features of a portable device which are unsuited for the connection features of the underside of the cover part or the fin part, electrical connection means adapted to connect with the electrical connection means provided on the fin part which either mimic such connection means or adapt them to a different type of connection means which correspond to those of a particular portable device.

In a most preferred embodiment, the electrical connection includes facility for an antenna signal and/or audio signal to be transmitted therethrough. With such a feature, the driver of the vehicle using a suitable specified PND can enjoy navigation commands, hands mobile telecommunications calls, and mp3 playback over the vehicle manufacturer-installed audio system of the vehicle.

Accordingly, the docking apparatus of the present invention provides an alternative to the standard windscreen-affixed cradle mounting currently employed for portable navigation devices, and thus overcomes the various disadvantages associated therewith.

DETAILED DESCRIPTION

Figure 1:
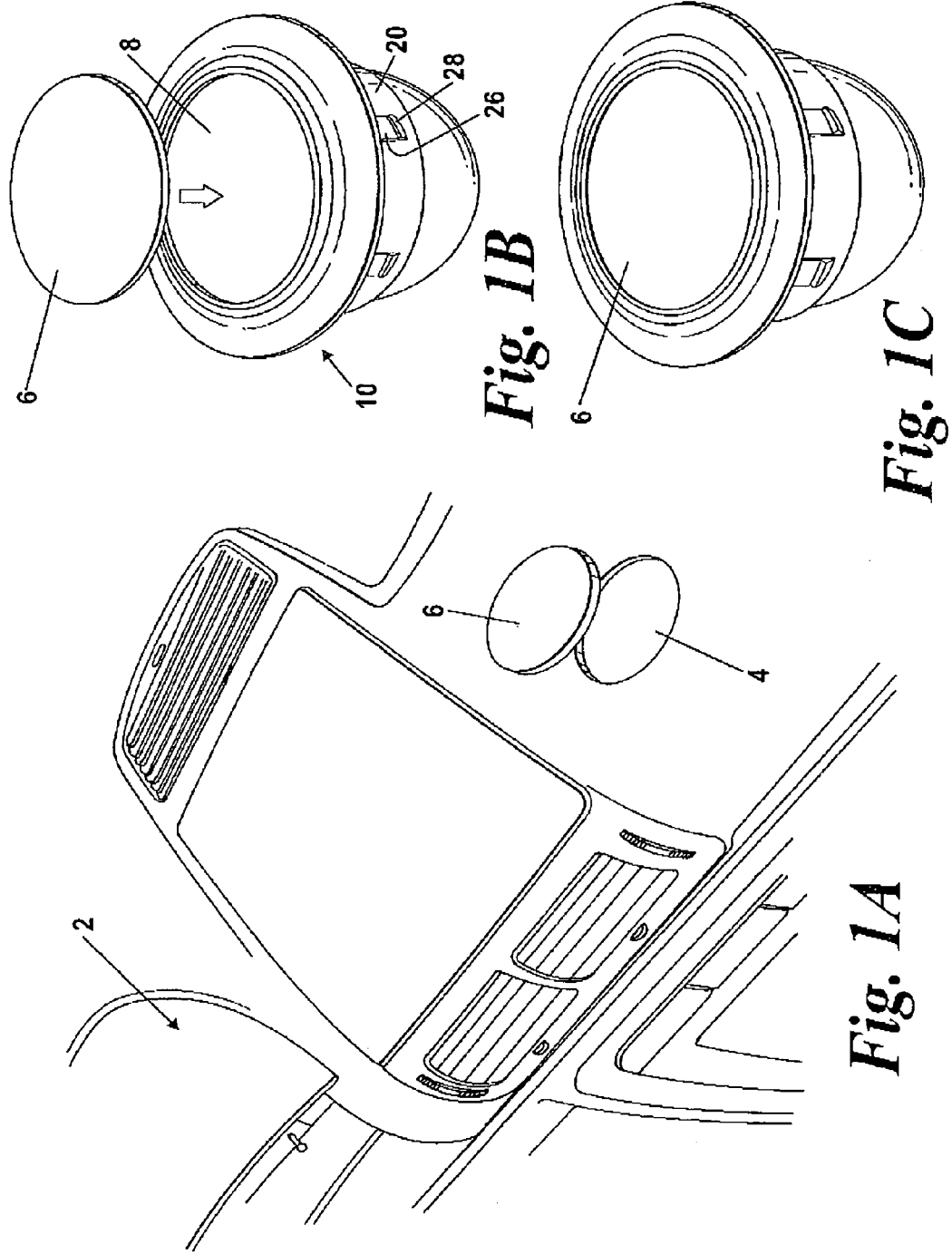
FIGS. 1A, B, C show a perspective view of a car dashboard, and schematic views of the docking apparatus respectively.

Referring firstly to FIG. 1A, there is shown a vehicle dashboard 2 on one side of which may be cut or provided an aperture 4 thus producing a disc 6 of dashboard material which may be trimmed and secured to an upper surface 8 of a docking apparatus indicated generally at 10. In this manner, the docking apparatus can substantially blend in with the dashboard once it is secured therein as hereinafter described.

Figure 2:
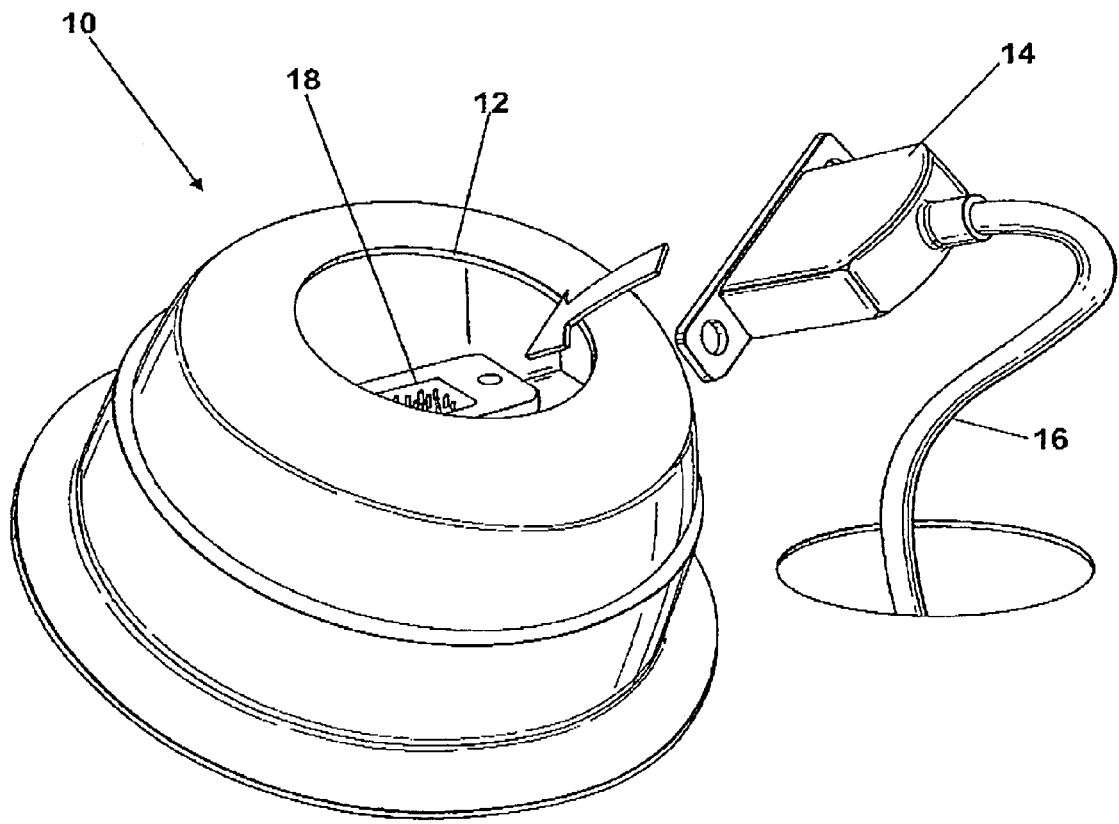
FIG. 2 shows a perspective view of the underside of the docking apparatus and the manner of electrical connection therewith, FIGS. 3A, B show a schematic perspective view of the docking apparatus in-situ, and a sectional view therethrough, FIGS. 4A, B C show respectively perspective and sectional views of the pivoting movement of the mounting part of the docking apparatus, and enlarged schematic views of a cam retaining cam mechanism provided on the mounting part, FIGS. 5A, B, C show respectively perspective and sectional views of the docking apparatus with the mounting part retained in the second position, and an enlarged view of a locking mechanism provided on a fin part of the docking apparatus.

In FIG. 2, the underside of the docking apparatus 10 is shown, and in particular is provided with an aperture 12 through which an electrical connector 14, provided within the dashboard and wired at 16 to the internal electrical and electronic systems of the vehicle, can pass to facilitate connection thereof to a corresponding connector 18 provided within the docking apparatus.

Referring now to FIGS. 3A, 3B, the docking apparatus 10 comprises a base 20 consisting of an annular peripheral lip 22 from the inner edge of which depends a skirt 24 which together ensure that the base can be securely inserted in push-fit manner into the aperture 4 defined in the dashboard 2, and is prevented from falling therethrough by said lip which is supported by an upper surface 2A of the dashboard. Referring back to FIG. 1B, it can be seen that the base 20 is provided with deflectable tabs 26 having hook formations 28 which lock behind a lower surface 2B of said dashboard.

In the described embodiment, an intermediate component 30 is provided within the base 20 and is secured therein in push-fit manner. Said intermediate component is substantially hemi-spherical in shape defining an inner cavity 32 therein to which access is had through the aperture 12. Within the intermediate component is provided a mounting part indicated generally at 40 which comprises a cover part 42 having an upper surface 42A to which the trimmed disc 6 is secured, and a lower surface 42B from which a fin part 44 depends. Said fin part may be suitably attached to said cover part, for example by being integrally formed therewith. Provided on one side of the fin part 44 is a connector 46, which may be for example a commonly known "D-type" or other suitable connector, which may be simply mounted or adhered in place, or alternatively connected to a corresponding connector, possibly provided in a mounted printed circuit board 48. The supply of electric power, or other electric or electronic signals to said connector is provided through cable 47. An aperture 50 provided in the fin part 44 exposes a further connector 52 by means of which electric/electronic connection may be achieved with the portable device.

In accordance with the invention, the mounting part 40 is pivotally mounted about an axis indicated at 54, in this embodiment, in the intermediate part 30, although it should be mentioned that the intermediate component is optional, and the mounting part may be directly pivotally mounted within the base 20.

As previously mentioned, the mounting part can adopt two positions, a first of which is shown in FIG. 3B. It is retained in this position by means of a push-cam mechanism shown in greater detail in FIG. 4C. To operate the docking apparatus such that the connector 52 becomes exposed, a user applies downward pressure as indicated by arrows 58 to release the push-cam mechanism, whereupon, the cover part, fin part, and associated connectors can pivot within the intermediate component (or base) until the fin comes into substantially co-planar relationship with the lip 22 of the base 20. The pivoting motion and the exposure of the connectors is clearly shown in FIGS. 4A, B, and the motion of a typical push-cam mechanism, known and easily implementable by one skilled in the art, is clearly shown in FIG. 4C. Again with reference to FIG. 3B, a simple sliding lock mechanism 60 is provided at the remote end of the fin part 44 to enable the releasable retention of the mounting part 40 in its second position, shown in FIGS. 5A, B, C. Furthermore, the reader will note the provision of connection features 62 such as ribs, grooves, channels, or the like on the underside 42B of the cover part 42. It is to be mentioned that any type of connection feature may be provided, but in this embodiment, and as can more clearly be seen in FIG. 5A, the connection features 62 are in the form of a pair of substantially parallel guide rails which cooperate with a pair of correspondingly shaped grooves on the rear surface of a PND or other portable device. It can also be seen from FIG. 5A that the sliding lock 60 is clearly accessible to a user, whereby the mounting part may be secured in the second "open" position in which a portion of the cover part 42 extends upwardly from the docking apparatus 10 at a slight angle to the vertical such that any device mounted thereon is also appropriately inclined for ease of view or use, particularly when the portable device includes a visual display. The position and exposure of the connector 52 is to be noted, proximate the lower reaches of the connection features 62, such that sliding fitment of a portable device thereon automatically aligns the connector 52 with the corresponding connector (not shown) provided on the base of the portable device, both connectors ultimately mating when the portable device is completely and properly mounted on said cover part 42. As may also be seen in the enlarged view in FIG. 5C, the lock 60 consists of a simple slider which can be moved back and forth, in one of which positions the slider engages within a suitable detent 61 provided in the intermediate component 30 to prevent further pivoting motion of the mounting part 20 and to lock said mounting part in the second, "open" position.

Figure 6:
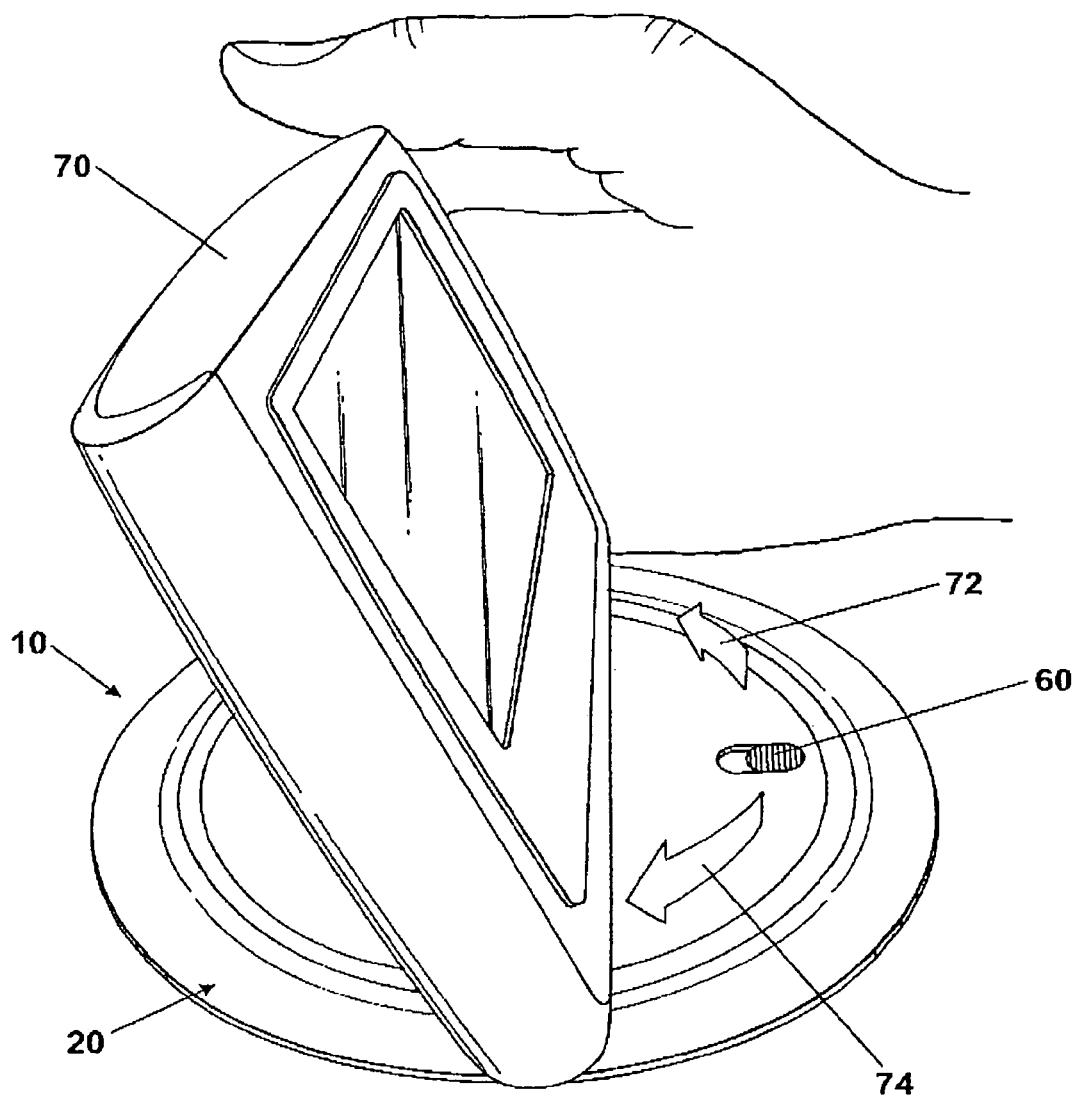
FIG. 6 shows a perspective view of the portable device secured to the docking apparatus, FIGS. 7A, B, C show respectively a perspective view the mounting of a portable device to the docking apparatus when an adapter is employed, a perspective view of an alternative type of adapter, and a sectional view of the connection of a portable device using such alternative adapter, FIG. 8A, B, C, D respectively show a perspective view of an adapter, a sectional view of the docking apparatus with said adapter remaining connected thereto, a perspective view of an alternative larger adapter, and a sectional view of said larger adapter connected to the docking apparatus in its second open condition.

FIG. 6 clearly shows a portable navigation device 70 mounted in place on the docking apparatus 10. An optional feature which may be incorporated into the docking apparatus is the facility for the mounting part to swivel as indicated by arrows 72, 74, further optionally while the lock is in a position which secures the fin part 44 to the intermediate component or the base as the case may be.

In FIGS. 7A, B, C, there is provided an alternative arrangement wherein an adapter 80 is provided having a first connector 82 complementary to the connector 52 exposed through the aperture to the underside of fin 44 of the docking apparatus 10, and a second connector 84 which is complementary to the connector (not shown) on the underside of the portable device 70. Additionally, connection means 86 are provided to the rear of the adapter 80 which are complementary to the connection features 62 provided on the exposed surface of the cover part 42, and suitable connection features 88 are provided on the alternate face which allow for the sliding connection of the portable device 70, again included corresponding and complementary connection features (not shown) in its rear surface. The adapter may either be of the type shown in FIG. 7A which is sufficiently discreet to be fitted to the upstanding cover part 42 and to complete an electrical connection between the connector 82 and the connector 52 without impeding the pivotal movement of the mounting part, as shown in FIGS. 8A, 8B, or the adapter may be of an alternative type 90 shown in FIGS. 7B and 8C, which includes tabs 92, 94 allowing for push—as opposed to sliding-fit of a portable device, and a connector 96 complementary to the connector 52. However, in analogous manner to the adapter 80, sliding fit of adapter 90 to the cover part 42 is still required for respective connection of connectors 96 and 52, as shown in FIG. 7C. As can be seen in FIG. 8D, the adapter is too large to be concealed within the docking apparatus.

Figure 9:
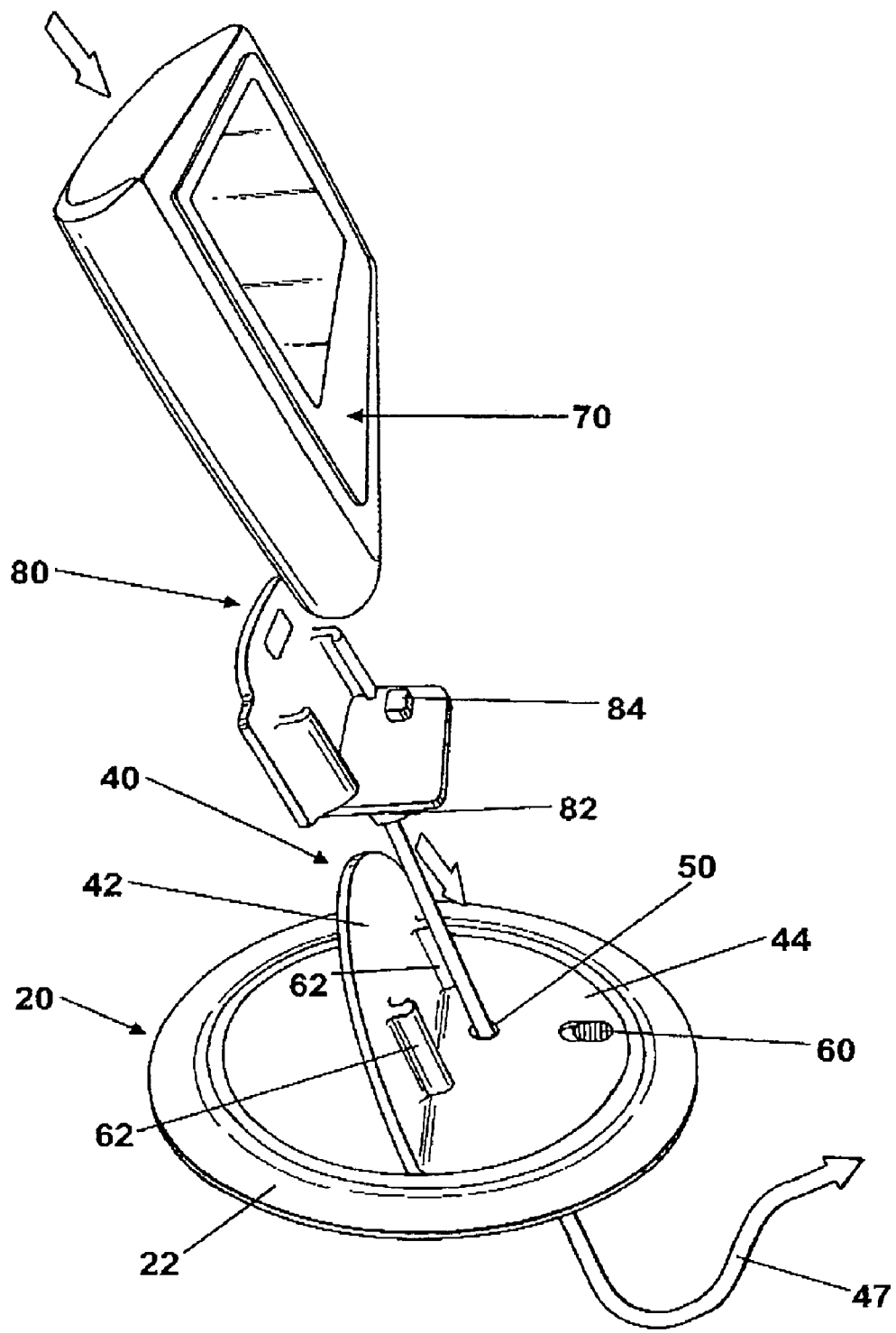
FIG. 9 shows a perspective view of a docking apparatus, an adapter and a PND prior to connection and a cable provided through the docking apparatus.

Finally, referring to FIG. 9, in an alternative aspect of the invention, the fin 44 of the mounting part is merely provided with an aperture 50 through which the cable 47 may pass, the connector 46 at the end thereof merely being manually attached to the corresponding and complementary connector 82 of the adapter 80.

The invention claimed is:

1. A docking apparatus for a portable device, said docking apparatus comprising at least a base and a mounting part which is connected to the base,
    wherein the mounting part is pivotally mounted within said base and consists of at least a cover portion which in a first position lies in substantially co-planar relationship with a lip of said base, said cover portion capable of being pivoted to a second position wherein part of the cover portion extends substantially from the docking apparatus, said pivotal motion also revealing a fin part depending from the underside of said cover portion so that in said second position, said fin part lies in substantially co-planar relationship with said lip instead of said cover portion,
    wherein at least one of:
    the underside of the cover portion, and
    the fin part,
    is provided with one or more cooperating connection features which cooperate with corresponding features provided on the portable device to facilitate the connection of the latter to the former, and
    wherein both the underside of said cover portion and the fin part are revealed in the second position.

2. A docking apparatus according to claim 1 wherein the base is additionally provided with a partial or continuous peripheral lip to the inside of which depends a skirt capable of being inserted through an aperture in a mounting surface thereby securing the base to said surface, said lip preventing the base from falling through said aperture.

3. A docking apparatus according to claim 1 wherein the base and the mounting part are substantially circular in cross-section.

4. A docking apparatus according to claim 1 wherein at least one of the mounting part and the base includes push-release means which in their locked condition secure the mounting part in the first position, and in their released condition allow pivotal movement of said mounting part.

5. A docking apparatus according to claim 1 wherein the base and the fin part include cooperating locking means which facilitate the locking of the fin part to the base to secure the mounting part in the second position.

6. A docking apparatus according to claim 1 wherein an intermediate base part is provided within which the mounting part is pivotally mounted, said intermediate base part being secured to the base in a push-fit manner.

7. A docking apparatus according to claim 6 wherein at least one of the mounting part and the intermediate base part includes push-release means which in their locked condition secure the mounting part in the first position, and in their released condition allow pivotal movement of said mounting part relative to said intermediate base part.

8. A docking apparatus according to claim 7 wherein at least one of the intermediate base part and the fin part of the mounting part include cooperating locking means which facilitate the locking of the fin part to the intermediate base part thus securing the mounting part in the second position.

9. A docking apparatus according to any of claim 8 wherein the mounting part is both pivotally and rotationally mounted in said intermediate base part.

10. A docking apparatus according to claim 1 wherein the mounting part is both pivotally and rotationally mounted in said base part.

11. A docking apparatus according to claim 1 wherein cooperating connection features are provided on the underside of the cover portion of the mounting part, such allowing the portable device to be slidingly connected to said cover portion underside when disposed in an upward condition when the mounting part is in the second position.

12. A docking apparatus according to claim 11 wherein the fin part is provided with at least an aperture and an electrical connector disposed behind said aperture such that sliding connection of the portable device thereto automatically aligns the electrical connector with a corresponding connector provided on the portable device and ultimately achieves sound electrical connection therebetween.

13. A docking apparatus according to claim 1 which further includes a data bus connector.

14. A docking apparatus according to claim 13 wherein the bus connector is a universal serial bus (USB) connector.

15. A docking apparatus according to claim 1 wherein the cooperating connection features consist of guide rails.

* * * * *